United States Patent
Alexander et al.

(10) Patent No.: US 6,944,779 B2
(45) Date of Patent: Sep. 13, 2005

(54) POWER MANAGEMENT FAULT STRATEGY FOR AUTOMOTIVE MULTIMEDIA SYSTEM

(75) Inventors: Douglas Alexander, South Lyon, MI (US); David Paul Wright, Redford, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 640 days.

(21) Appl. No.: 09/735,003

(22) Filed: Dec. 11, 2000

(65) Prior Publication Data

US 2001/0016918 A1 Aug. 23, 2001

Related U.S. Application Data

(63) Continuation-in-part of application No. 09/353,684, filed on Jul. 14, 1999, now Pat. No. 6,367,022.

(51) Int. Cl.[7] .................................................. G06F 1/26
(52) U.S. Cl. ........................... 713/300; 714/10; 714/23; 701/33
(58) Field of Search ................................. 713/300, 322, 713/323, 320, 340, 324, 330, 2; 714/10, 23, 1, 2, 14, 24, 25; 701/1, 29, 33, 31

(56) References Cited

U.S. PATENT DOCUMENTS

| 4,698,748 | A | | 10/1987 | Juzswik et al. | |
|---|---|---|---|---|---|
| 4,775,957 | A | | 10/1988 | Yakuwa et al. | |
| 4,888,697 | A | | 12/1989 | Hemminger et al. | |
| 5,146,601 | A | * | 9/1992 | Hosaka et al. | 713/501 |
| 5,151,855 | A | | 9/1992 | Gray et al. | |
| 5,560,022 | A | | 9/1996 | Dunstan et al. | |
| 5,680,308 | A | | 10/1997 | Warren | |
| 6,274,949 | B1 | * | 8/2001 | Lioux et al. | 307/64 |
| 6,351,823 | B1 | * | 2/2002 | Mayer et al. | 714/10 |
| 6,434,713 | B1 | * | 8/2002 | Shin et al. | 714/25 |

FOREIGN PATENT DOCUMENTS

EP 1069495 A2 7/2000

OTHER PUBLICATIONS

William C. Spellman, *Entertainment and Information Merge in the Automobile*, Feb., 1996, pp. 49–55.

* cited by examiner

Primary Examiner—Thuan Du
(74) Attorney, Agent, or Firm—Brinks Hofer Gilson & Lione (57) ABSTRACT

A multimedia/personal computer-based system for operating information, communication, and entertainment devices in a mobile vehicle uses a power management strategy which reduces power consumption and boot-up time in a manner which facilitates use of a complex instruction set computing (CISC) processor system. A power management fault strategy detects fault conditions and restores proper operation without user intervention. A low power microprocessor off-board of the main motherboard switches a plurality of regulated voltages to the main motherboard and other devices. The main application microprocessor on the main motherboard sends periodic status messages to the low power microprocessor. Various strategies are provided for limiting attempts to correct a fault, monitor the state of the application microprocessor, and transition between states.

29 Claims, 9 Drawing Sheets

POWER MANAGEMENT FAULT STRATEGY FOR AUTOMOTIVE MULTIMEDIA SYSTEM

CROSS REFERENCE TO RELATED APPLICATION

This application is a continuation-in-part of U.S. patent application Ser. No. 09/353,684, filed Jul. 14, 1999, now U.S. Pat. No. 6,367,022. This application is also related to co-pending application U.S. Ser. No. 09/353,685, entitled "Power Management for Automotive Multimedia System," filed Jul. 14, 1999. These applications and patents are hereby incorporated by reference herein in their entirety.

BACKGROUND OF THE INVENTION

The present invention relates in general to a method and apparatus for supplying power to an automotive Multimedia/personal computer system, and, more specifically, to a power management fault strategy for detecting fault conditions and restoring proper operation without user intervention.

Power management is an important issue in portable computing devices. This is especially true in mobile vehicles which have a limited battery capacity and which have stringent current limitations. As microprocessor-based systems become more powerful by using larger microprocessors and using a greater number of peripheral devices, power requirements increase. In vehicles containing an internal combustion engine and alternator, electric power generation may be sufficient to operate without much difficulty. In vehicles using other power plants or in an internal combustion engine vehicle with the engine shut off, significant limitations may be placed on current consumption (both normal operating current and quiescent current) of the multimedia/PC system.

Partly due to available power limitations, microprocessors having low power requirements are normally used in mobile vehicles. As mobile computing functions have been introduced into vehicles, reduced instruction set computing (RISC) microprocessors have been chosen since they are smaller and consume less power. Thus, complex instruction set computing (CISC) microprocessors such as Intel Pentium (x86) microprocessors and the Motorola 680x0 family of microprocessors have been avoided. However, RISC microprocessors cannot run the same software as has been created for CISC microprocessors. Availability of operating system and applications software is much greater for CISC microprocessors because of the popularity of desktop and laptop personal computers. Therefore, it would be very beneficial to use a CISC microprocessor in a mobile vehicle.

An important performance issue for a multimedia/personal computer based system in a mobile vehicle is boot-up time. A multimedia system may be providing information, communication, entertainment, or other functions which the vehicle user may expect to be available as soon as the vehicle ignition switch is turned on. By example, the multimedia system may include a navigation function and the driver may want to initiate input of a desired destination as soon as possible after turning on the vehicle. By maintaining full or partial power to the multimedia system, boot-up time can be reduced or eliminated, but this conflicts with the need to minimize power consumption. CISC microprocessors such as the Pentium typically have reduced power states in which processing operations are suspended while the state of the memory and the internal microprocessor state are stored. Such a reduced power state may be entered in response to various conditions monitored by the microprocessor. However, the microprocessor can't go completely to sleep and still monitor the conditions which should wake it up. Furthermore, if the microprocessor has sole responsibility to conduct its own power management, then there is limited ability to recover from errors.

Co-pending application U.S. Ser. No. (199-0056) describes a vehicle input/output processor (VIOP) using a low power microprocessor to manage power for a main application microprocessor. Various operating states of the main application microprocessor and the low power microprocessor facilitate low current consumption while a vehicle ignition is off, fast boot-up times when the ignition is on, and intermediate boot-up times if the ignition has been off (but not if it has been off for a long period of time, such as 24 hours). However, if the main application processor malfunctions, the proper operating states may not be obtained and unacceptable current consumption may result.

SUMMARY OF THE INVENTION

The present invention has the advantages of providing efficient and robust power management of an in-vehicle multimedia/personal computer-based system, while detecting fault conditions and restoring proper operation without user intervention.

In a first aspect of the invention, a method of powering a vehicle information, communication, or entertainment system is provided for mobile operation of information, communication, or entertainment devices in a vehicle. The vehicle has a vehicle powered state and a vehicle unpowered state. The method includes monitoring a state of a main application processor with a management processor. A change from a suspend-to-RAM state to a Run state without a request from the management processor is detected. A transition to a suspend-to-disk state is requested if the main application processor is in a state other than the suspend-to-disk state after a first time period after the detection of a change.

In a second aspect, the method includes attempting to change the main application processor from a suspend state to a Run state. A status message is monitored with the management processor. A fault is corrected if the status message is absent after a time period that is a function of the suspend state of the main application processor.

In a third aspect, the method includes attempting to change the main application processor from a suspend state to a Run state. A status message is monitored with the management processor. A reset signal is generated if the status message is absent a first time period. If the main application processor fails to change states in response to the reset signal, the attempted change is ceased.

In a fourth aspect, the method includes determining the state of the main application processor in response to a wakeup signal. If the state is a suspend state, a change to a Run state is attempted. If the state is a Run state, the state is monitored for a time period for a change to the suspend state.

In a fifth aspect, the method includes attempting a change from a suspend state to a Run state. The management processor monitors the state of the main application processor. If the state is unchanged after a first time period, the attempt is repeated. If the repeated attempt fails, the attempts are ceased.

In a sixth aspect, the method includes attempting to place a main application processor in a suspend state. If the attempt fails, the voltage to the main application processor is removed without a reset attempt.

The present invention is defined by the following claims, and nothing in this section should be taken as a limitation on

BRIEF DESCRIPTION OF THE DRAWINGS

FIG. 3 is a state diagram showing monitoring of heartbeat messages during full-power operation.

FIG. 6 is a state diagram showing fault management during shutdown to the suspend-to-disk state of the main application microprocessor.

DETAILED DESCRIPTION OF PREFERRED EMBODIMENTS

Figure 1:
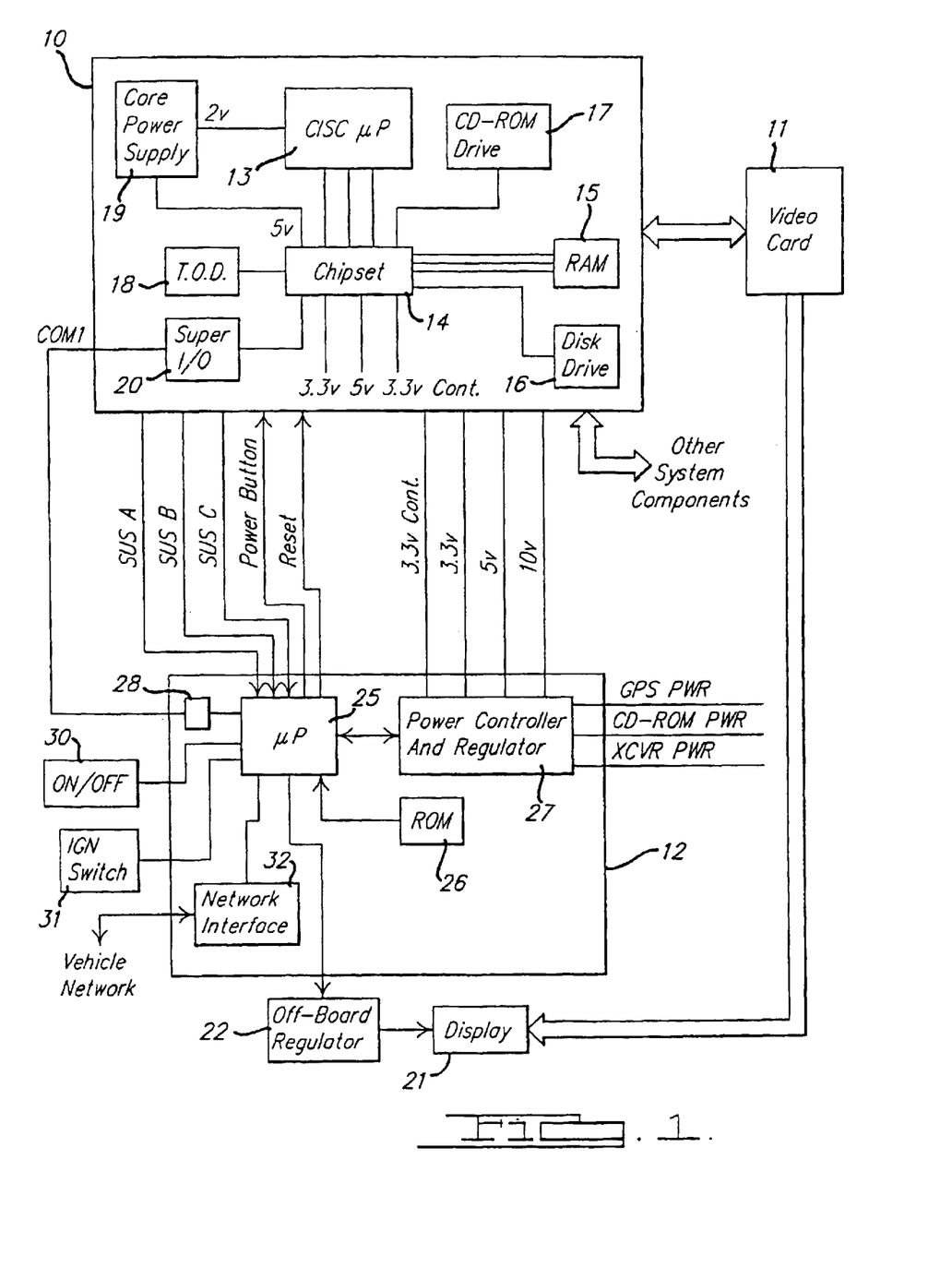
FIG. 1 is a block diagram showing a multimedia system employing the power management strategy of the present invention.

Referring to FIG. 1, a motherboard 10 is connected to a video processor card 11 and a vehicle input/output processor (VIOP) board 12. Motherboard 10 includes a complex instruction set computing (CISC) processor 13 which may comprise an Intel Celleron processor, for example. A support chip set 14 is connected to processor 13 and is adapted to function specifically with microprocessor 13. Support chip set 14 may be one or more integrated circuits and may preferably be comprised of north and south portions of an Intel Banister Bridge.

Chip set 14 provides interfaces between processor 13 and various other devices and provides local power conditioning and management for processor 13. Support chip set 14 includes a DRAM memory controller for controlling a DRAM memory 15. Chip set 14 also includes interface controllers for a mass storage devices such as a disk drive 16 and a CD-ROM drive 17. Processor 13 is a main application processor and executes operating system software and application programs contained on disk drive 16 and/or CD-ROM drive 17.

A time of day (TOD) unit 18 is connected to chip set 14 and keeps track of time of day in a conventional manner. A small on-board battery (not shown) is preferably provided to maintain operation of TOD unit 18 even when power is off to motherboard 10.

Chip set 14 receives several different regulated voltages from VIOP 12 as is described below. Chip set 14 uses the regulated voltages to provide power to processor 13 and DRAM 15 according to its own, conventional power management strategy. Motherboard 10 may further include a core power supply 19 driven by chip set 14 to provide a regulated voltage at a value not being supplied by VIOP 12.

A super-input/output (I/O) interface 20 is connected to chip set 14 and provides a serial communications port COM1 which is connected to VIOP 12. The serial communications link carries messages between processor 13 and VIOP 12 relating to power management and to input and output data and control signals.

Motherboard 10 includes other conventional components which are not shown such as standard bus interfaces such as ISA, PCI, and USB interfaces. Video card 11 may be connected to a PCI expansion slot, for example. Video card 11 includes a video output connected to a display 21 which is powered by an off-board regulator 22 under control of VIOP 12. Display 21 comprises any one or more of various display devices, such as a liquid crystal display (LCD) or monitor.

VIOP 12 includes a reduced power microprocessor 25 which executes program instructions contained in a read-only memory (ROM) 26, for example. Reduced power microprocessor 25 may be comprised of a Motorola 68 HC 912 processor, for example, or other low power processor of the type often used on automotive applications. A principle job of processor 25 is to control a power controller and regulator 27 which has a plurality of switched and unswitched regulated voltage outputs. For example, switched outputs of 3.3V, 5V, and 10V are provided along with an unswitched (i.e., continuous) supply of 3.3V. Each of these regulated voltages is provided to main motherboard 10 and then distributed to various components which use them, including chip set 14. These voltages are used to operate microprocessor 13, power memory 15 for refreshing and accessing memory contents, and for powering portions of chip set 14 itself. In addition, power may be directly supplied to disk drive 16, CD-ROM 17 and TOD unit 18.

Power controller and regulator 27 may also provide regulated voltages to devices located remotely from motherboard 10 and VIOP 12, such as power regulator 22 for display 21. As another example, a separate, remote module may include a GPS receiver and a wireless data transceiver receiving GPS power (GPS PWR) and transceiver power (XCVR PWR) from power controller and regulator 27.

VIOP 12 includes a physical interface 28 for providing a serial port connection for microprocessor 25 to communicate with the COM1 port of motherboard 10. In addition, there are several direct communication lines connected between motherboard 10 and microprocessor 25. Microprocessor 25 provides a power button signal in response to an on/off switch 30 controlled by the user to indicate when to place the multimedia system in an in-use condition, and a reset signal for causing the main application processor 13 to reboot. Chip set 14 provides three distinct signals SUS A, SUS B, and SUS C, which identify the suspended power state in which the power management strategy of chip set 14 is operating.

Microprocessor 25 also receives a signal from an ignition switch 31 to identify whether the vehicle is in a powered state or an unpowered state. Based upon the state of ignition switch 31 and on/off switch 30, microprocessor 25 and microprocessor 13 each determine an appropriate power state for main application processor 13 and chip set 14. Depending upon the current state and next desired state of microprocessor 13 and chip set 14, microprocessor 25 may merely verify that the correct state has been implemented by chip set 14, it may command a different state over the serial communication link, or it may switch the state of power controller and regulator 27 to provide different regulated voltages to main motherboard 10. Also based upon the state of various switches or other inputs, microprocessor 25 may control the switching on and off of off-board regulator 22 for powering display 21 as appropriate. A network interface 32 is contained in VIOP 12 and is connected to microprocessor 25. Network interface 32 may be connected to a vehicle network for exchanging data and control signals between motherboard 13 and a vehicle communication or multiplex network (also using the serial communication link between motherboard 10 and VIOP 12).

Figure 2:
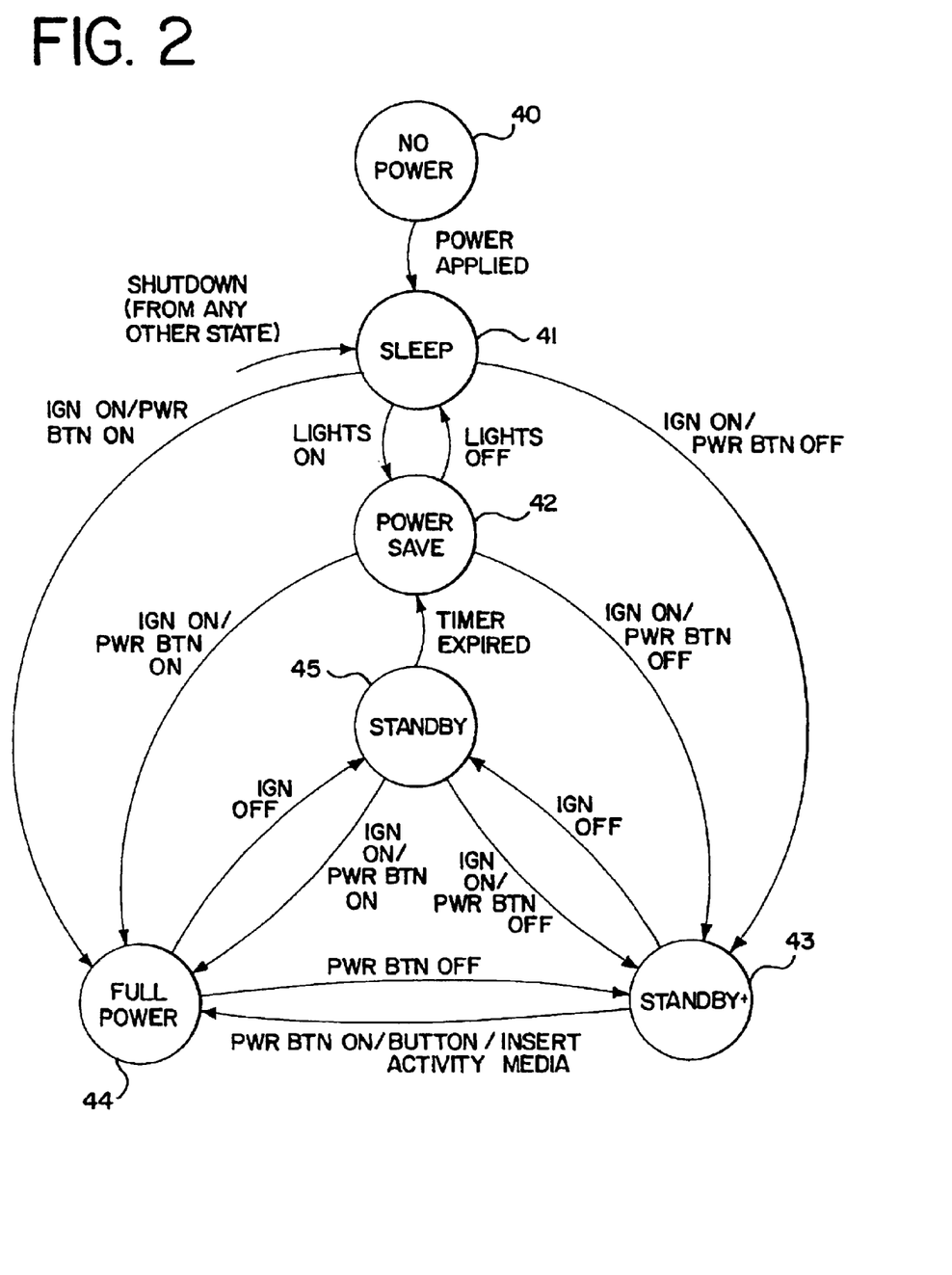
FIG. 2 is a state diagram showing state transitions of the system in FIG. 1.

Operation of the power management strategy for the multimedia system will be described in connection with the state diagram of FIG. 2. Prior to application of any power, the multimedia system is in No Power state 40. In No Power state 40, main battery power is disconnected and all units are off. Once power is applied, the multimedia system transitions to a Sleep state 41. Sleep state 41 is characterized by the following conditions: ignition is off, the VIOP unit is asleep, the main microprocessor and chip set are off, the display is off, remote wireless and GPS units are off, CD-ROM unit is off, and display backlighting is off (backlighting refers to background lighting of an LCD display and is desirable to provide general panel lighting of a vehicle dashboard during low light conditions even though the unit itself is off). During Sleep state 41, if the vehicle external lights such as headlights are turned on, then it is desirable to supply backlighting power for the display. Thus, a lights-on condition triggers a transition to a Power Save state 42 in which the VIOP unit is awake and can control backlighting power to the display. When the lights then go off, a transition is made to return to Sleep state 41.

Transition may be made to Sleep state 41 from any other state during a shutdown caused by an error or lock-up condition of the main microprocessor causing it to fail to respond to VIOP messages. In that case, the VIOP processor shuts down all switched power to main motherboard 10 thereby initiating Sleep state 41.

Power Save state 42 is characterized by the following conditions: ignition is off, VIOP unit is awake, main application processor and chip set are asleep in a suspend-to-disk state (referred to as a D3 state for an Intel Celleron processor), the display is off, wireless and GPS transceivers are off, CD-ROM unit is off, and display backlighting may or may not be on depending upon other vehicle settings (e.g., headlights). When the vehicle ignition turns on, a transition will be made out of Power Save state 42 depending upon the status of the on/off power button on the multimedia unit itself. If the power button is off, then a transition is made to Standby+ state 43. If the power button is on, then a transition is made to Full Power state 44.

Standby+ state 43 is characterized by the following conditions: ignition is on, VIOP unit is awake, main processor and chip set are on, display is off, wireless data transceiver is off, GPS unit is on, CD-ROM unit is off, and backlighting of the display is dependent on other lamp states. While in Standby+ state 43, a transition may be made to Full Power state 44 in response to the turning on of the power button, activity on any other button controls of the multimedia system as appropriate, or the insertion of a media such as a CD audio disc. If the ignition switch is turned off while in Standby+ state 43, a transition is made to Standby state 45.

Figure 7:
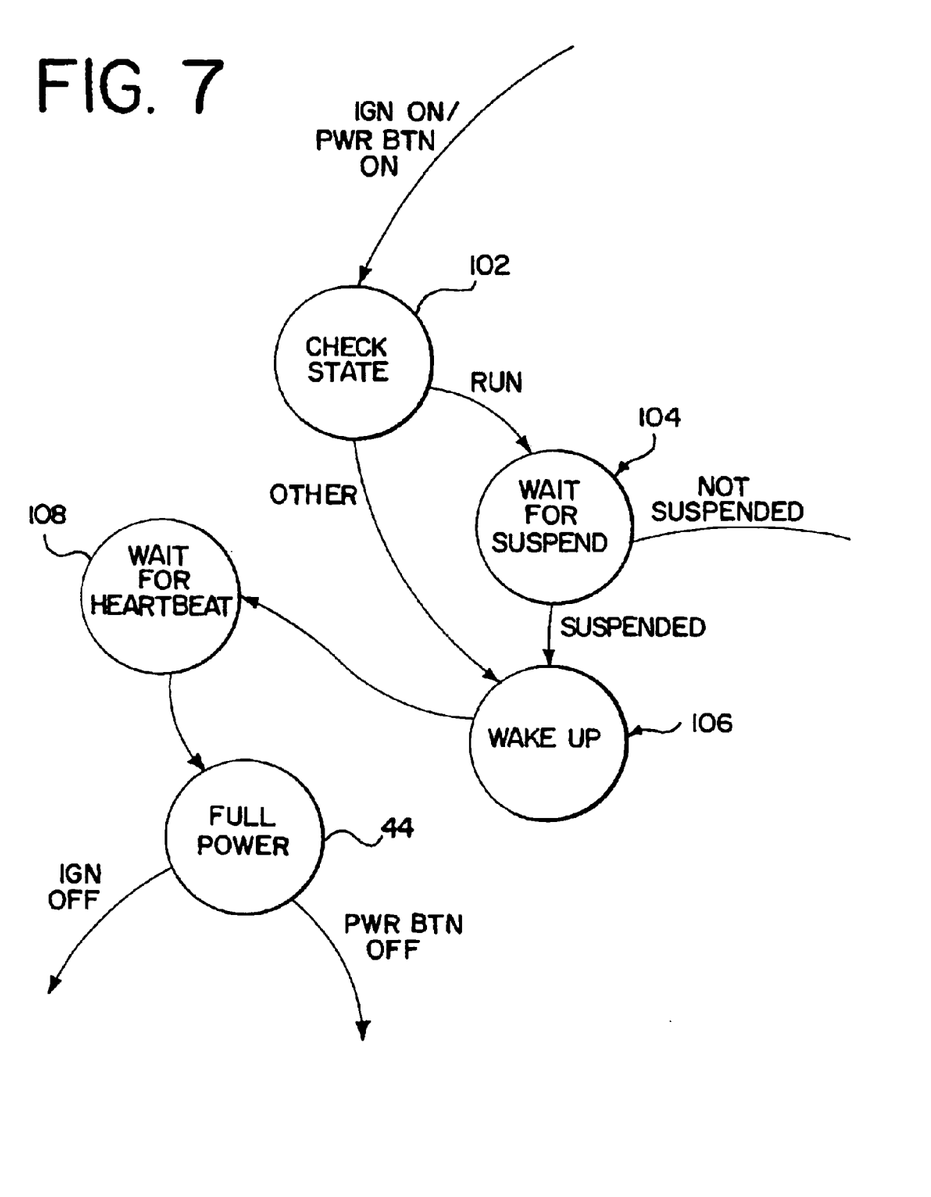
FIG. 7 is a state diagram showing one embodiment for transitioning to a full power state.

In one embodiment, the state of the main microprocessor is checked prior to the transition to the Full Power state 44. FIG. 7 shows a state diagram with a check state 102 for entering the Full Power state 44. For any of the activities shown in FIG. 2 for waking up the main microprocessor, such as the ignition on with the power button on, the state of the main microprocessor is checked. If the state is Run or Full Power state 44, the VIOP unit waits for a suspend to process in state 104. For example, a five second or other timeout period passes. Assuming the main microprocessor enters a suspend state as monitored by the VIOP unit, a wakeup command is provided by the VIOP unit in state 106. If the timeout passes without the main processor entering the suspend state, then the VIOP unit waits for an initial heartbeat as described below (e.g. the fault strategy associated with the initial heartbeat is implemented to correct any faults).

If the main microprocessor is not in a Run state during the check 102, the wakeup command is provided to the main microprocessor in state 106. The VIOP unit then waits for an initial heartbeat 108 and the transition to the Full Power state 44. Checking the state of the main microprocessor prior to the transition to the Full Power state 44 avoids resetting the main microprocessor when a transition to a suspend state is being executed. Where the main microprocessor is running for another reason, a wakeup attempt may not be attempted.

Referring again to FIG. 2, Standby state 45 is characterized by the following conditions: ignition is off, VIOP unit is awake, the main processor and chip set are asleep in the suspend-to-RAM state (designated as state S3 in the Intel Celleron power management strategy), display is off, wireless transceiver and GPS receiver are off, CD-ROM unit is off, and display backlighting depends upon vehicle lamps. When in Standby state 45, a fairly low quiescent current consumption of about 100 mA may be obtained. Although this current draw is fairly low, it is higher than can be maintained for extremely long periods in a vehicle which must rely on its main battery for starting the vehicle internal combustion engine. Therefore, Standby state 45 includes operating of the time of day timer in order to detect a predetermined period of time, after which a transition is made to Power Save state 42. In Power Save state 42, the main processor and chip set switch to the suspend-to-disk condition and since the DRAM memory does not need to be continuously refreshed, the power consumption may drop to about 35 mA.

In a preferred embodiment, the predetermined period of time is about 24 hours. If the vehicle is re-started within 24 hours, the current state of memory will still be in DRAM and a much faster boot-up of the system can be achieved (a boot-up time of about 6 seconds as opposed to a boot-up time of from 60 to 90 seconds from the suspend-to-disk condition). If the ignition switch is turned on while in Standby state 45, a transition is made to Standby+ state 43 or Full Power state 44 depending upon the position of the power button.

In the Full Power state 44, all units are on and fully awake. If the power button is turned off while in Full Power state 44, a transition is made to Standby+ state 43. If the ignition switch is turned off while in Full Power state 44, then a transition is made to Standby state 45.

The main microprocessor and chip set may have many different suspend or low power states. In the preferred embodiment of the present invention, the suspend-to-RAM and suspend-to-disk power states are preferred to be used. In the suspend-to-RAM (S3) power state, an instant on and boot-up time of 6 seconds is achieved. During this power state, the DRAM is in a self refresh mode. In the preferred embodiment using an Intel Celleron processor and a 430Tx Bannister Bridge chip set, the chip set is configured so that about 80% of the chip set is turned off. Specifically, the north bridge PCI/ACPI well is powered, the DRAM lines are set for self refresh mode, and the south bridge interrupt controller and power controller have power while the Pentium processor is off. The suspend-to-RAM state draws between 70 and 100 mA of current and the state may be exited by pressing the power button while the ignition is on, or by a reset signal from the VIOP.

In the suspend-to-disk (D3) power state, an image or snapshot of the DRAM memory contents is stored to disk (preferably a compact flash drive). The north bridge of the chip set is powered down and the south bridge is mostly powered down except for the south bridge section that has power control. Current draw is between 1 and 2 mA in this power state. Current draw results in part from the need to drive the SUS A, B, and C lines for giving the power state status of the main controller and chip set.

The serial communications link between microprocessors 13 and 25 carries various types of messages, such as input/output data and control signals for various peripheral devices. In addition, fault management and status messages are communicated to permit reduced power microprocessor 25 to ensure proper operation of the multimedia system. Thus, if the main application microprocessor becomes "locked-up" or "frozen," this is detected by the reduced power microprocessor and action can be taken to restore proper operation without requiring user intervention. Furthermore, if the main application microprocessor assumes a power state other than the one required by the power management strategy, this is detected and, if not correctable, then the reduced power microprocessor avoids possible excessive current consumption by shutting off most power to the main application microprocessor.

The fault management strategy of the present invention employs a status message (or "heartbeat" message) that is programmed to be sent periodically by the main application microprocessor to the reduced power microprocessor whenever the main application microprocessor is running (i.e., operating in the Full Power state or the Standby+ state). When the processor is first booted up, there will be some delay before it is able to send its first heartbeat message. Thereafter, the main application processor is programmed to generate a regular heartbeat message (e.g., every 5 seconds). If the reduced power microprocessor fails to receive an expected heartbeat message within this predetermined time, then the main application processor is assumed to have malfunctioned and corrective action is taken.

This portion of the fault strategy is shown in greater detail in FIG. 3. After initiation of a boot-up of the main application processor, the fault strategy enters a state 50 wherein a waiting period is established within the reduced power microprocessor of 60 seconds. During this 60 second time period, a heartbeat message would be expected from the main application processor if boot-up to a normal running state is achieved. If, as expected, a heartbeat message is received during the 60 second time period, then a shorter waiting period of 5 seconds is established in a state 51. If a heartbeat message is received during the shorter waiting period, then the fault strategy stays in state 51 with a re-initiation of the 5 second waiting period. If a heartbeat message is not detected by the reduced power microprocessor during the 5 second waiting period, then it enters state 52 and sends a reset signal to the main application processor to re-boot it. Then the reduced power microprocessor returns to state 50 to establish the 60 second waiting period.

In one embodiment, the initial waiting period (60 seconds in the above example) varies as a function of the main microprocessor's state. For example, a change from a suspend-to-RAM or suspend-to-disk state to a Run state is attempted. If the main microprocessor is transitioning from an off, suspend-to-disk or a state other than the suspend-to-RAM state, the waiting period is set to 60 seconds, 120 seconds or another time period. If the main microprocessor is transitioning from the suspend-to-RAM state, the initial waiting period is set to 5 seconds or another time period shorter than for other states. This shorter time period allows for earlier detection of errors. The varied time periods account for the difference in booting or wake-up time as a function of the state of the main microprocessor.

If a heartbeat message is not received during the 60 second or other time period in state 50, then a series of resets followed by additional 60 second or other waiting periods are established in states 53 through 58. If a heartbeat message is received while in states 54, 56, or 58, then normal operation results in state 51. If on the final try in state 58 no heartbeat message is received, then the regulated voltages supplied to the main motherboard by the VIOP power controller and regulator are cycled off and then back on in an attempt to recover proper operation of the main application microprocessor. Then the main application microprocessor attempts to restart or re-boot, and the fault strategy returns to state 50.

Figure 8:
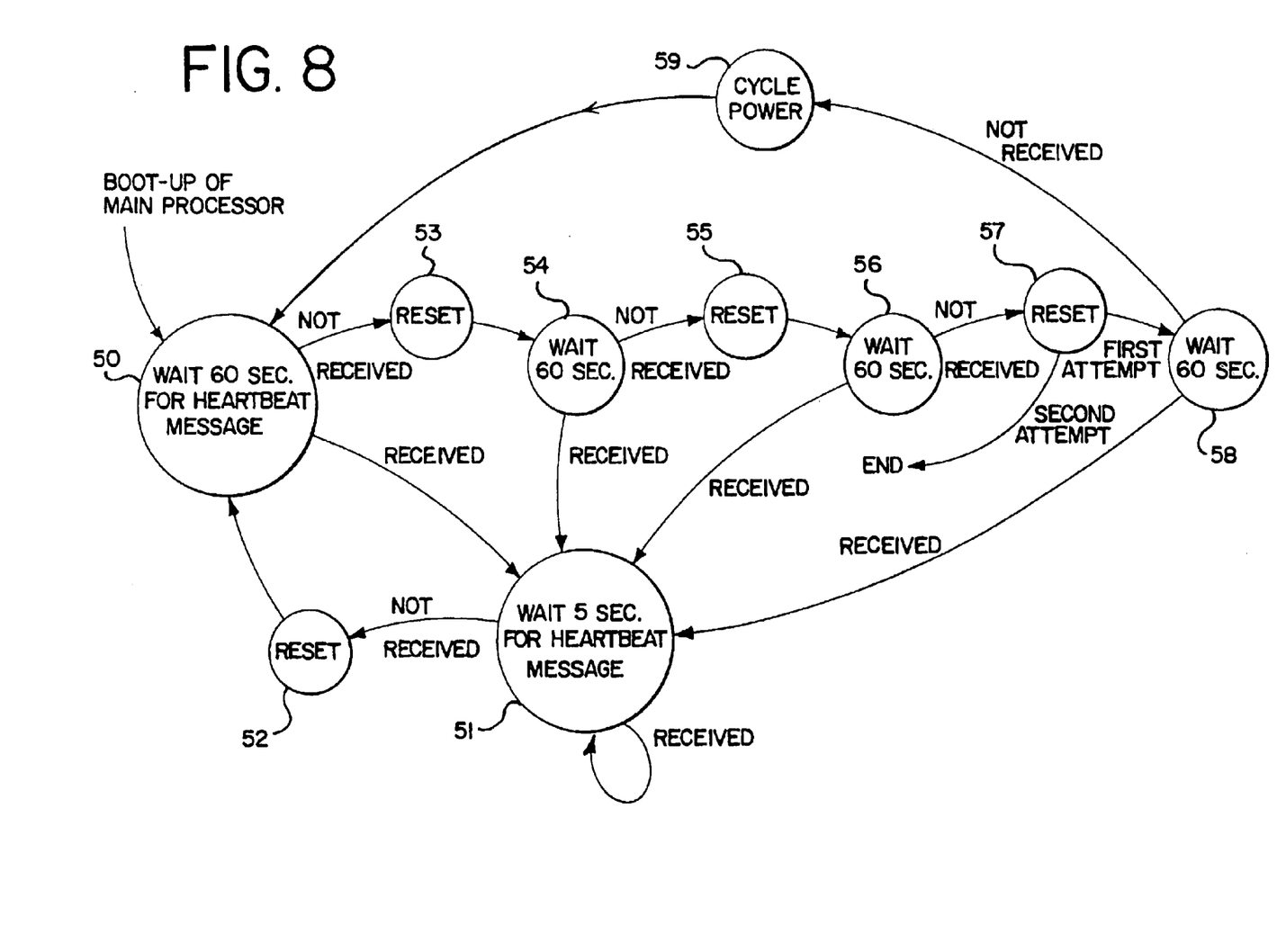
FIG. 8 is a state diagram showing one embodiment for limited monitoring of heartbeat messages during full-power operation.

In an alternative embodiment to change the main application processor from a suspend state to a Run state shown in FIG. 8, the fault strategy returns to state 50 a limited number of times, such as once. If the first two or three resets in states 53, 55 and 57 fail and cycling the power in state 59 fails, the fault strategy returns to state 50. Thereafter, the resets are attempted again. If these resets fail, the fault strategy ceases to attempt to wake-up the main microprocessor. When the ignition is turned of and then turned on, the fault strategy may repeat.

Other activities may also occur in response to ceasing the wake-up attempt, such as turning off a display, turning off LCD backlighting, and/or removing power to other components. In alternative embodiments, only one reset is attempted after returning to state 50. Furthermore, fewer or additional of any of resets or cycling power may be attempted before cycling power and/or ceasing to attempt to wake up the main microprocessor.

Figure 4:
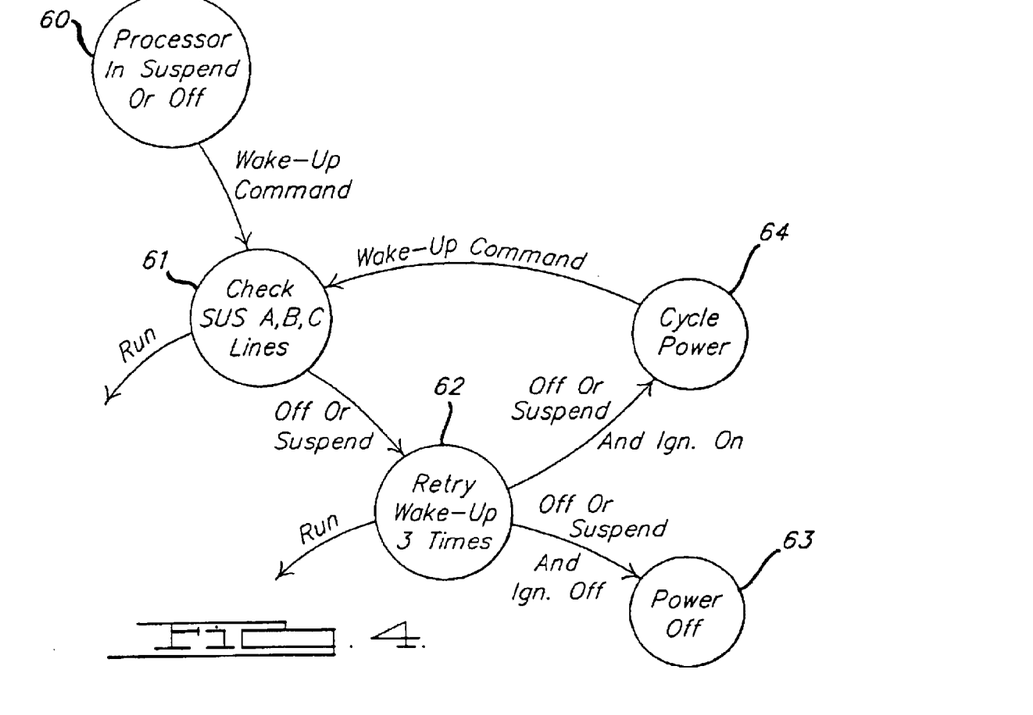
FIG. 4 is a state diagram showing fault management during wake-up of the main application microprocessor.

A portion of the fault strategy of the present invention active during an attempt to wake up the main application processor from a suspend-to-disk (OFF or D3) condition or a suspend-to-RAM (SUSPEND or S3) condition is shown in FIG. 4. The main application microprocessor is in SUSPEND or OFF initially in state 60. A transition to state 61 is made in response to a wake-up command. Such a wake-up command may be a signal generated by any devices in the system such as a user control push button (e.g., power button), the vehicle ignition switch, or insertion of a media (e.g., CD-ROM, CD audio, or cassette tape). The main motherboard may respond directly to these signals and may generate a wake-up command itself. In addition, the reduced power microprocessor monitors these conditions and determines when existing conditions should wake the main application processor to its full-powered operating state. Then, in state 61, it checks status lines SUS A, B, and C, to determine the power state of the main application processor. If these lines indicate a run state, then no further action is taken. However, if these lines indicate an OFF or SUSPEND state, then the reduced power microprocessor transmits its own wake-up command over the serial communication link in state 62. The wake-up command is retried up to 2 more times (after sufficient waiting periods) if the command is unsuccessful. After the final try, then the state of the vehicle ignition is determined. If the ignition is off, then there should be no further consumption of current and the regulated voltages are turned off in state 63. On the other hand, if the ignition is on then the regulated voltages are cycled off and back on in state 64 in an attempt to restore proper system operation. Then another wake-up command is transmitted and a return is made to state 61.

Figure 9:
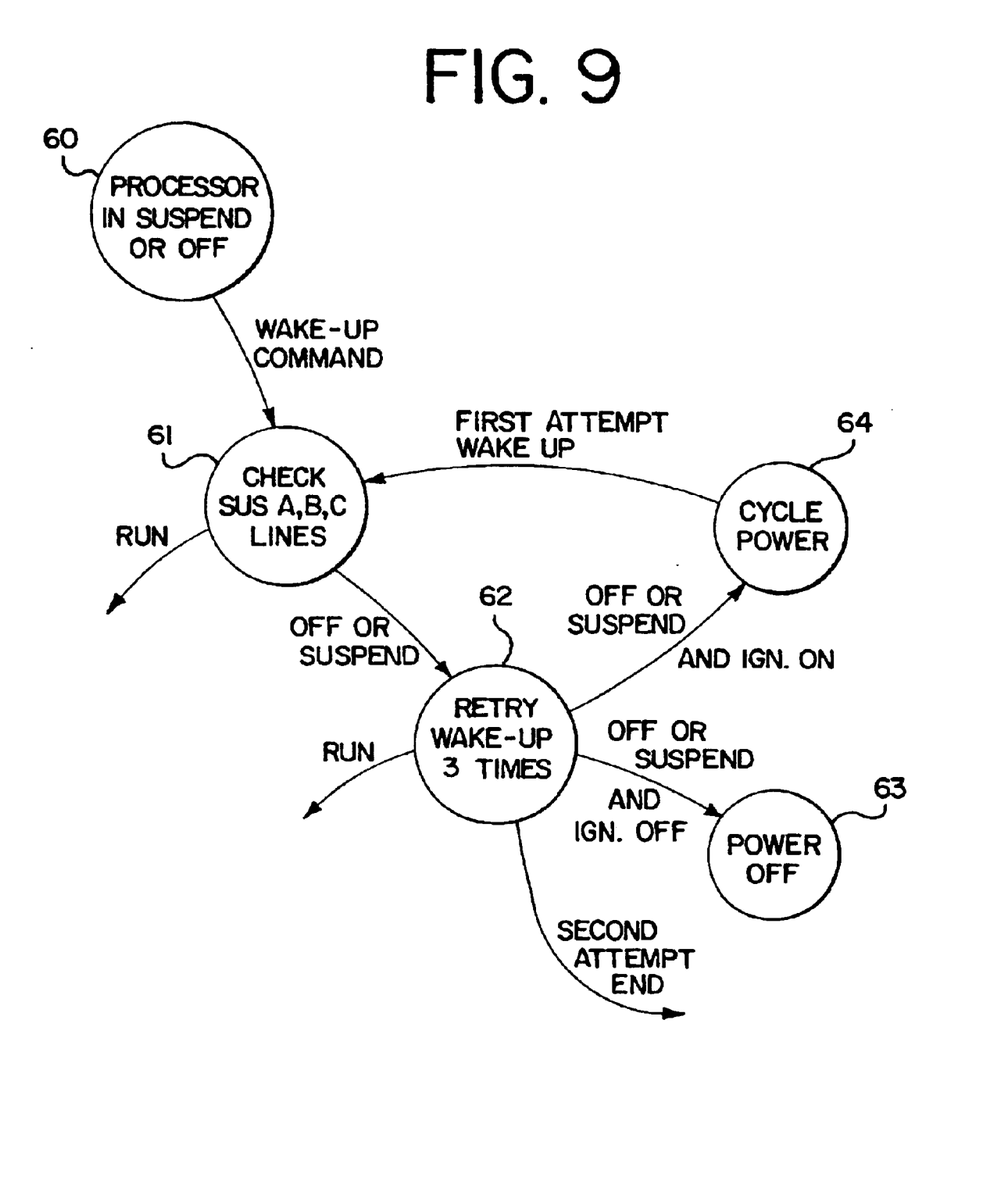
FIG. 9 is a state diagram showing one embodiment of limited fault management during wake-up of the main application microprocessor.

Alternatively, if the main microprocessor fails to transition out of the suspend state in response to a limited number of retrying a wake-up command and/or cycling power 64, the attempts to wake up the main microprocessor are ceased until the ignition is turned off and then on again. FIG. 9 shows the state diagram of FIG. 4 altered to limit the number of retries when the ignition is on. In the embodiment shown in FIG. 9, the fault strategy returns to state 61 once after cycling the power in state 64. If the main microprocessor does not wake up, the wake-up command is repeated in state 62. If the main microprocessor fails to wake-up, the attempts to wake-up the main microprocessor are ceased in order to avoid further drain of power and damage to components, such as the LCD. In alternative embodiments, the wake-up command is not repeated after returning to state 61, a different number of retries are performed (e.g. 2 instead of 3) and/or more than one attempt including cycling the power is made.

Figure 5:
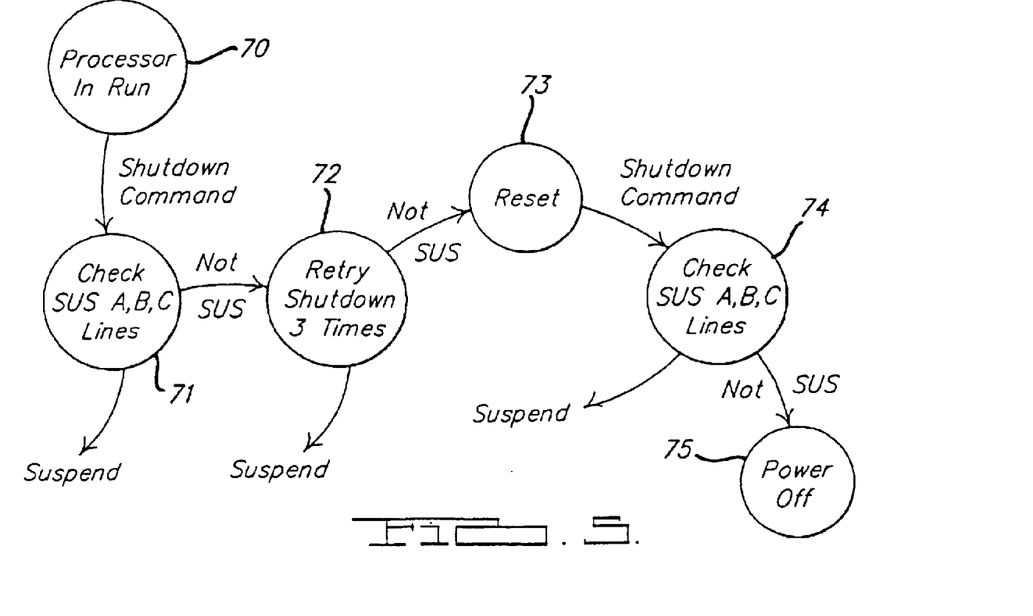
FIG. 5 is a state diagram showing fault management during shutdown to the suspend-to-RAM state of the main application microprocessor.

A portion of the fault strategy of the present invention active during an attempt to shutdown the main application processor to a suspend-to-RAM (SUSPEND or S3) condition from a full-on condition is shown in FIG. 5. Proper shutdown to the SUSPEND condition is important in order to ensure limited current consumption when not in use and to limit boot-up time the next time the vehicle ignition switch is activated (i.e., within the next 24 hours).

In state 70, the main application processor is in a full-on or run condition. A transition to state 71 is made in response to a shutdown command. Such a shutdown command may be the signal generated by the vehicle ignition switch being turned to its off position. The main motherboard preferably responds directly to the signal and generates the shutdown command itself. In addition, the reduced power microprocessor monitors the ignition switch and determines when the main application processor should be going to its suspended operating state. Then, in state 71, it checks status lines SUS A, B, and C, to determine the power state of the main application processor. If these lines indicate a SUSPEND state, then no further action is taken. However, if these lines indicate a run state, then the reduced power microprocessor transmits its own shutdown command over the serial communication link in state 72. The shutdown command is retried up to 2 more times (after sufficient waiting periods) if the initial command is unsuccessful. After the last try and if the SUSPEND condition is still not achieved, then a reset signal is sent to the main application microprocessor in state 73. After reset, a further shutdown command is sent and the SUS A, B, and C lines are checked again in state 74. If the SUSPEND condition is still not achieved, then the regulated voltages are powered off in state 75.

A portion of the fault strategy of the present invention active during an attempt to shutdown the main application processor to a suspend-to-disk (OFF or D3) condition from a suspend-to-RAM condition is shown in FIG. 6. Proper shutdown to the OFF condition is important in order to ensure minimal to no current consumption during long term non-use at the expense of having a long boot-up time the next time the vehicle ignition switch is activated.

In state 80, the main application processor is in a suspend-to-RAM condition. Both the main application microprocessor and the reduced power microprocessor detect passage of a long duration time period (e.g., 24 hours). Preferably, the time period measured by the reduced power microprocessor is slightly longer, so that if the main application microprocessor functions properly, it will perform the suspend-to-disk operation (e.g., transferring RAM contents to a compact flash drive) on its own. When the slightly longer time period measured by the reduced power microprocessor expires, a transition is made in state 81 where the reduced power microprocessor checks status lines SUS A, B, and C to determine the power state of the main application processor. If these lines indicate an OFF state, then the suspend-to disk has already been executed and no further action is taken. However, if these lines indicate a SUSPEND state, then the reduced power microprocessor transmits a wake-up command over the serial communication link in state 82 so that a shutdown-to-disk command can be executed by the main application processor. Status lines SUS A, B, and C are checked in state 83 to verify that a full-on or run state has been entered. If the run state is achieved, then a suspend-to-disk (STD) command is transmitted in state 84. Otherwise, the wake-up command is retried up to 3 more times in state 85 (after sufficient waiting periods). After the last try and if the run condition is still not achieved, then regulated voltages are turned off to the main application microprocessor in state 86.

Once the run state is achieved and the STD command transmitted in state 84, status lines SUS A, B, and C are checked in state 87 to verify that the OFF state has been entered. If not, then the STD command is retried 3 more times in state 88. If the OFF state is still not achieved, then a reset signal is sent in state 89, another STD command is sent in state 90, and a final status check is made of status lines SUS A, B, and C, in state 91. If the OFF state is still not achieved, then power to the main application microprocessor is turned off in state 92.

Figure 10:
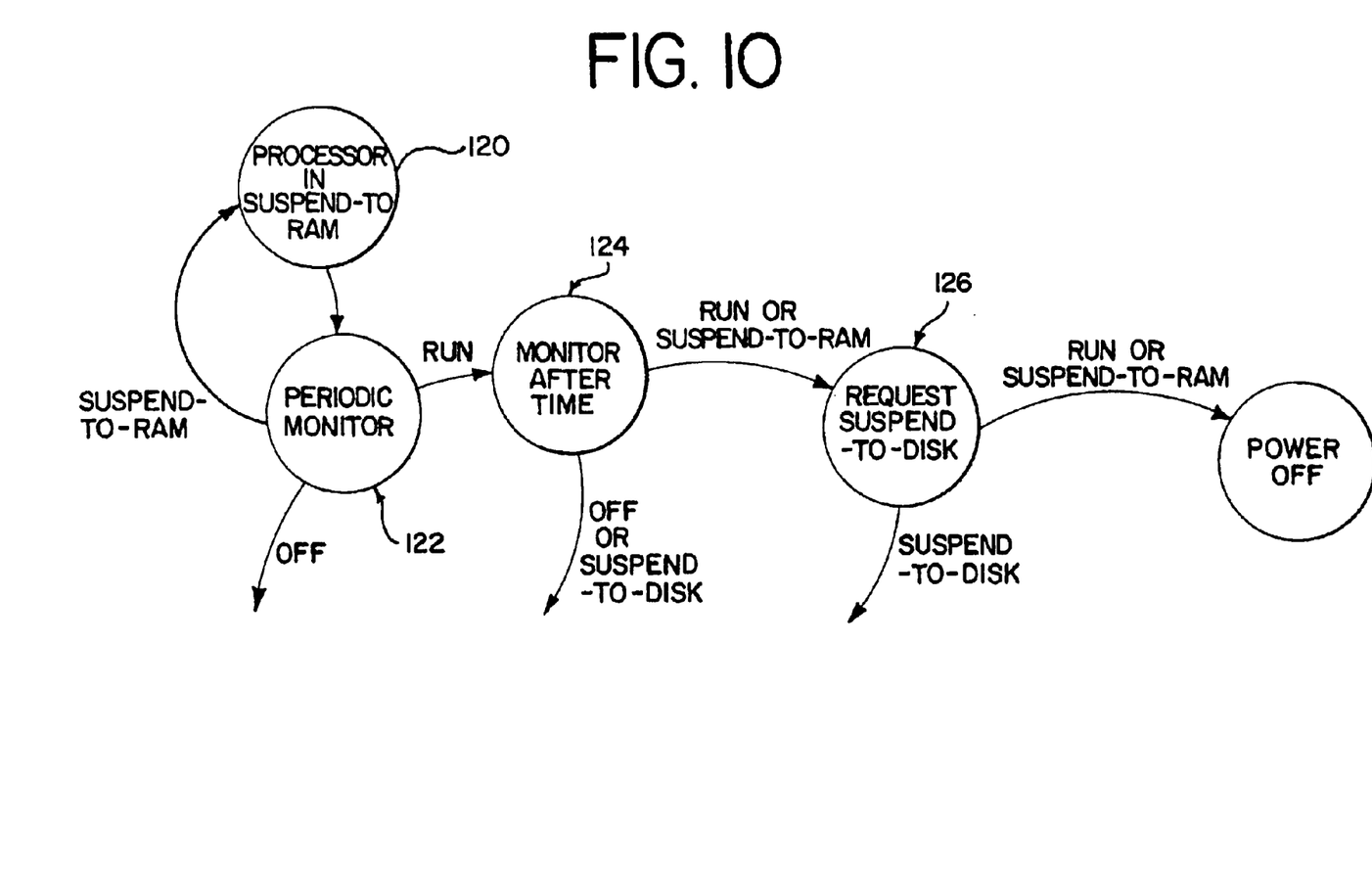
FIG. 10 is a state diagram showing one embodiment of a fault strategy for transitioning from a suspend-to-RAM to a suspend-to-disk state.

In an alternative embodiment, the reduced power microprocessor monitors the main microprocessor in the suspend-to-RAM state in order to detect any errors. FIG. 10 shows the states of the main microprocessor and reduced power microprocessor for this embodiment. The main microprocessor is in the suspend-to-RAM state 120. In state 122, the reduced power microprocessor periodically awakes from a sleep state to monitor the state of the main microprocessor. For example, the reduced power microprocessor wakes every 7 or 8 seconds and checks status lines SUS A, B, and C to determine the power state of the main application processor. Other time periods may be used, such as time periods based on the amount of power consumption acceptable while minimizing the time period (i.e., increasing the frequency of checks for any errors). The reduced power microprocessor monitors the status without a request for a state change in this embodiment.

If the status lines indicate an OFF state, then the suspend-to disk has already been executed and no further action is taken. For example, the software or hardware of the main application processor schedules and implements a transition to a suspend-to-disk state. If these lines indicate the suspend-to-RAM state, the reduced power microprocessor continues to monitor the main microprocessor. The monitoring continues for as long as the 24 hour or other suspend-to-RAM main application processor software or hardware designated total time period for suspending-to-disk passes. After this total time period, the fault strategy discussed above for FIG. 6 is performed.

If the lines indicate a Run state, the reduced power microprocessor waits for a time period to check the lines again in state 124. In one embodiment, the time period is about 90 seconds, but other time periods based on the time the main microprocessor and other hardware need, average or may use to suspend-to-disk from a Run state may be used. If after the time period, the main microprocessor is OFF or in the suspend-to-disk state, the reduced power microprocessor returns to sleep, shuts-down or transitions to a lower power state. If after the time period, the main microprocessor is in the Run or suspend-to-RAM state, the reduced power microprocessor transmits a request for the main microprocessor to suspend-to-disk in state 126. If the main microprocessor transitions to the suspend-to-disk state, the reduced power microprocessor returns to sleep, shuts-down or transitions to a lower power state. Otherwise, power to the main microprocessor is turned off.

In yet other alternative embodiments, resets are not performed for failed attempts to suspend-to-RAM or suspend-to-disk. Since the contents of the RAM are not maintained through a reset in some application processors, the power to the main application microprocessor is turned off in states 75 or 92 of FIG. 5 or 6, respectively. The resets of states 73 and 89 are skipped.

While the invention has been described above by reference to various embodiments, it will be understood that many changes and modifications can be made without departing from the scope of the invention. For example, any of the various embodiments or aspects may be used alone or in combination with the same or different hardware.

It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. A method of powering a vehicle information, communication, or entertainment system in a vehicle, said vehicle having a vehicle powered state and a vehicle unpowered state, said method comprising the steps of:
   (a) monitoring a state of a main application processor with a management processor;
   (b) detecting a change from a suspend-to-RAM state to a Run state without a request from the management processor;
   (c) requesting a transition to a suspend-to-disk state if the main application processor is in a state other than the suspend-to-disk state after a first time period after (b).

2. The method of claim 1 further comprising:
   (d) the main application processor returning to the suspend-to-RAM state after (b) and before (c).

3. The method of claim 1 further comprising:
   (d) the main application processor continuing in the Run state until (c).

4. The method of claim 1 further comprising:
   (d) operating the management processor in a sleep mode; and
   (e) periodically activating the management processor from the sleep state;
   wherein (a), (b), and (c) occur in response to (e).

5. The method of claim 1 further comprising:
   (d) turning off a voltage to the main application processor if the main application processor fails to assume the suspend-to-disk state in response to (c).

6. The method of claim 1 further comprising:
   (d) scheduling a suspend-to-disk state of the main application processor pursuant to software of the main application processor; and
   (e) the main application processor changing from the suspend-to-RAM state to the Run state in response to (d).

7. A method of powering a vehicle information, communication, or entertainment system in a vehicle, said vehicle having a vehicle powered state and a vehicle unpowered state, said method comprising the steps of:
   (a) attempting a change from a suspend state to a Run state of a main application processor;
   (b) monitoring for a status message from the main application processor with a management processor; and
   (c) correcting a fault if the status message is absent a time period that is a function of the suspend state.

8. The method of claim 7 wherein (a) comprises attempting a change from a suspend-to-RAM state.

9. The method of claim 8 wherein (c) comprises correcting if the status message is absent about five seconds.

10. The method of claim 7 wherein (a) comprises attempting a change from a suspend-to-Disk state.

11. The method of claim 7 wherein (c) comprises correcting if the status message is absent about sixty seconds.

12. The method of claim 7 wherein (c) comprises generating a reset signal.

13. The method of claim 7 wherein (c) comprises correcting if the status message is absent a lesser time period for a change from a suspend-to-RAM state than for a change from a suspend-to-Disk state.

14. The method of claim 12 further comprising:
   (d) cycling regulated voltages off and then back on to said main application microprocessor if said status message is not received during a further predetermined time period; and
   (e) ceasing (a) if the main application processor fails to change states in response to (d).

15. A method of powering a vehicle information, communication, or entertainment system in a vehicle, said vehicle having a vehicle powered state and a vehicle unpowered state, said method comprising the steps of:
   (a) attempting a change from a suspend state to a Run state of a main application processor;
   (b) monitoring for a status message from the main application processor with a management processor;
   (c) generating a reset signal if the status message is absent a first time period; and
   (d) ceasing (a) if the main application processor fails to change states.

16. The method of claim 15 further comprising:
   (e) repeating (c) at least twice;
   wherein (d) comprises ceasing (a) if the main application processor fails to change states in response to (e).

17. The method of claim 15 further comprising:
   (e) cycling regulated voltages off and then back on to said main application processor if said status message is not received during a further predetermined time period; and
   wherein (d) comprises ceasing (a) if the main application processor fails to change states in response to (e).

18. The method of claim 17 further comprising:
   (f) repeating (e);
   wherein (d) comprises ceasing (a) if the main application processor fails to change states in response to (f).

19. The method of claim 15 further comprising:
   (e) turning off LCD backlighting in response to (d).

20. The method of claim 15 further comprising:
(e) repeating (a), (b), (c) and (d) in response to a change from a vehicle unpowered state to a vehicle powered state.

21. The method of claim 15 wherein (c) comprises generating the reset signal wherein the first time period is selected a function of the suspend state.

22. A method of powering a vehicle information, communication, or entertainment system in a vehicle, said vehicle having a vehicle powered state and a vehicle unpowered state, said method comprising the steps of:
(a) determining a state of a main application processor in response to a wakeup signal;
(b) if the state comprises a suspend state, attempting a change from the suspend state to a Run state; and
(c) if the state comprises a Run state, monitoring for a change to the suspend state for a first time period.

23. The method of claim 22 further comprising:
(d) changing the main application processor from the suspend state to the Run state if the main application processor changes to the suspend state in the first time period.

24. The method of claim 22 further comprising:
(d) monitoring for a status message from the main application processor with a management processor; and
(e) correcting a fault if the status message is absent a second time period.

25. A method of powering a vehicle information, communication, or entertainment system in a vehicle, said vehicle having a vehicle powered state and a vehicle unpowered state, said method comprising the steps of:
(a) attempting a change from a suspend state to a Run state of a main application processor;
(b) monitoring for a state of the main application processor with a management processor;
(c) repeating (a) if the state is unchanged after a first time period; and
(d) ceasing (a) if the main application processor fails to change states in response to (c).

26. The method of claim 25 wherein (a) comprises generating a reset signal.

27. The method of claim 25 wherein (a) comprises cycling regulated voltages off and then back on to said main application processor.

28. The method of claim 25 wherein (c) comprises repeating (a) at least twice.

29. The method of claim 26 further comprising:
(e) cycling regulated voltages off and then back on to said main application processor at least twice after (a) and (c);
wherein (d) comprises ceasing in response to (a) and (e).

* * * * *